(12) United States Patent
Paul et al.

(10) Patent No.: US 6,330,217 B1
(45) Date of Patent: Dec. 11, 2001

(54) MEDIA CARTRIDGE INSERTION APPARATUS FOR A MEDIA CARTRIDGE STORAGE AND HANDLING SYSTEM

(75) Inventors: D. Scott Paul; Gregg S. Schmidtke; Paul Coffin, all of Fort Collins; Leslie G. Christie, Greeley, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 1060 days.

(21) Appl. No.: 08/491,286

(22) Filed: Jun. 16, 1995

(51) Int. Cl.⁷ .................................................. G11B 17/22
(52) U.S. Cl. ................................. 369/77.2; 360/92
(58) Field of Search ........................... 369/77.2, 34, 36, 369/178, 191–192; 360/92; 414/280, 283

(56) References Cited

U.S. PATENT DOCUMENTS

| | | | |
|---|---|---|---|
| 4,135,245 | 1/1979 | Kemplin et al. | 364/520 |
| 4,170,030 | 10/1979 | Castrodale et al. | 360/98 |
| 4,271,440 | * 6/1981 | Jenkins et al. | 360/92 |
| 4,413,291 | 11/1983 | Ueki et al. | 360/71 |
| 4,417,258 | 11/1983 | Tribolet et al. | 346/139 R |
| 4,527,262 | 7/1985 | Manto | 369/33 |
| 4,573,129 | 2/1986 | Tribolet et al. . | |
| 4,608,679 | 8/1986 | Rudy et al. | 369/36 |
| 4,614,474 | 9/1986 | Sudo | 369/178 |
| 4,675,856 | 6/1987 | Rudy et al. | 369/36 |
| 4,685,095 | 8/1987 | Rudy et al. | 369/36 |
| 4,742,504 | 5/1988 | Takasuka et al. | 369/36 |
| 4,786,955 | 11/1988 | Stupeck et al. | 360/105 |
| 4,787,047 | 11/1988 | Deck et al. | 369/36 |
| 4,797,865 | 1/1989 | Imai et al. | 369/36 |
| 4,815,055 | 3/1989 | Fago, Jr. | 369/36 |
| 4,817,070 | 3/1989 | Hug et al. | 369/36 |
| 4,817,071 | 3/1989 | Carlson et al. | 369/36 |
| 4,827,463 | 5/1989 | Motoyoshi et al. | 369/36 |
| 4,839,758 | 6/1989 | Honjoh | 360/99.06 |
| 4,853,916 | 8/1989 | Tomita | 369/36 |
| 4,879,615 | 11/1989 | Teranishi et al. | 369/34 |
| 4,912,575 | 3/1990 | Shiosaki | 360/92 |
| 4,918,548 | 4/1990 | O'Donnell et al. | 360/92 |
| 4,998,232 | 3/1991 | Methlie et al. | 369/36 |
| 5,062,093 | 10/1991 | Christie et al. | 369/36 |
| 5,289,441 | 2/1994 | Domberg et al. | 369/191 |
| 5,293,284 | 3/1994 | Sato et al. | 360/92 |
| 5,517,473 | 5/1996 | Permut | 369/36 |
| 5,544,146 | 8/1996 | Luffel et al. | 369/178 |

FOREIGN PATENT DOCUMENTS

| | | | |
|---|---|---|---|
| 0067449 | 6/1982 | (EP) . | |
| 1399327 | 5/1985 | (EP) . | |
| 0163463 | 12/1985 | (EP) . | |
| 0205074A2 | 12/1986 | (EP) . | |
| 288165 | 10/1988 | (EP) . | |
| 2594588 | 2/1987 | (FR) . | |
| 2610132 | 3/1988 | (FR) . | |
| 2449944 | 11/1989 | (FR) . | |
| 1183243 | 3/1970 | (GB) . | |
| 2082371A | 3/1982 | (GB) . | |
| 2106696 | 4/1983 | (GB) . | |
| 2280300A | 1/1995 | (GB) . | |
| 60-256968 | 5/1986 | (JP) . | |
| 62-124663 | 6/1987 | (JP) | 360/92 |
| 62-219364 | 9/1988 | (JP) . | |
| 60-229268 | 4/1989 | (JP) . | |

* cited by examiner

Primary Examiner—Brian E. Miller

(57) ABSTRACT

A media cartridge insertion apparatus for a media cartridge storage and handling system for use in association with a media cartridge of the type having a rear end portion which is adapted to be inserted into a media drive and having a forward end portion which is adapted to be grasped by a human operator for handling the cartridge comprising a cartridge receiving assembly for receiving a cartridge in a predetermined orientation therewith, said cartridge receiving assembly being displaceable between a first relatively rotated operating position and a second relatively rotated operating position angularly displaced from said first operating position.

17 Claims, 13 Drawing Sheets

MEDIA CARTRIDGE INSERTION APPARATUS FOR A MEDIA CARTRIDGE STORAGE AND HANDLING SYSTEM

FIELD OF THE INVENTION

The present invention relates generally to an optical disk storage and handling system and, more particularly, to an optical disk insertion apparatus for use with an optical disk handling system.

BACKGROUND OF THE INVENTION

An optical disk is a data storage medium which is readable by a laser-based reading device. Optical disks known as "compact disks" or "CDs" have become increasingly popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recently, magneto-optical disks and other types of optical disks have been developed which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are mounted in a generally parallelepiped-shaped cartridge. Such a cartridge has a forward end which is generally provided with a ribbed surface portion which is adapted to be grasped between the thumb and index finger of an operator for handling the cartridge. The cartridge is adapted to be readily mounted in a conventional optical disk drive by grasping its forward end and inserting the cartridge, rear-end-first, through a narrow slot provided on the front face of a disk drive.

Currently, most optical disks are hand-inserted into disk drives. However, for large databases consisting of many optical disks, it is preferable, and perhaps essential, to provide an optical disk storage system for storing the disks at known locations, and an optical disk handling system which is capable of retrieving a desired disk from a storage location and inserting the disk in an optical disk drive. In a disk storage system wherein stored disks and an associated disk drive are positioned in longitudinally extending storage locations arranged in a two-dimensional array consisting of vertically extending columns and horizontally extending rows, it will generally be necessary for a disk handling system to engage and move each disk longitudinally, vertically, laterally, and, again, longitudinally in order to remove it from storage, move it into aligned relationship with a disk drive, and insert it into a disk drive. It may also be necessary for the disk handling system to flip the disk to reverse the side thereof which will be positioned in readable relationship with a drive.

An optical disk handling apparatus which is adapted to engage and longitudinally displace and/or flip optical disk cartridges for inserting and removing the cartridges from various storage locations of an optical disk storage system is described in U.S. Pat. No. 4,998,232 issued Mar. 5, 1991 of Methlie, Oliver, Stavely, and Wanger, which is hereby specifically incorporated by reference for all that is disclosed therein. Such devices are generally referred to in the industry as "autochangers" or "optical disk juke boxes".

Other optical disk handling devices and components thereof are shown and described in U.S. patent application Ser. No. 08/491,538 of Paul and Smith for DOOR ASSEMBLY FOR A CARTRIDGE HANDLING DEVICE, filed on the same day as this application and in U.S. patent application Ser. No. 08/491,440 of Schmidtke, Coffin and Christie for TENSIONING DEVICE FOR A FLEXIBLE DRIVE MEMBER, filed on the same day as this application, which are hereby specifically incorporated by reference for all that is disclosed therein.

A problem is encountered when loading cartridges into an optical disk handling and storage system which uses a handling apparatus such as disclosed in the Methlie et al. patent application referred to above.

The problem is that in order for a cartridge to be positioned in proper relationship for engagement by the handling apparatus, it must be presented with its forward end located adjacent to an engagement portion of the handling apparatus. In order to achieve such an orientation, it would appear necessary to pass each cartridge through a system housing in an orientation opposite to the orientation of the cartridge when it is inserted into a disk drive. In other words, it would seem that the cartridge must be passed through the housing forward-end-first rather than rear-end-first. The problem with inserting a cartridge into a housing forward-end-first is that it is unnatural and annoying for most operators. Further, damage to cartridges and/or jamming of the handling system may occur if cartridges are inserted in the wrong orientation.

This problem has been overcome by a device which rotates the cartridge 180 degrees, thereby allowing a user to insert a cartridge into the housing rear-end-first and yet still provide proper orientation within the system. This device is described in U.S. Pat. No. 5,062,093 issued Oct. 29, 1991 of Christie, Wanger, Dauner, Jones and Domal, which is hereby specifically incorporated by reference for all that is disclosed therein.

Some optical disk handling systems are provided with windows that allow an operator to view the optical disk handling apparatus within the system. Such windows have been found to be useful because they allow an operator to visually verify that the system is functioning and that it is functioning in a desired manner. Because of the configuration of most handling systems, these windows are usually placed in a 90 degree orientation with respect to the direction in which the handling apparatus removes disks from the optical disk insertion apparatus.

One disadvantage of the 180 degree system described in U.S. Pat. No. 5,062,093 referenced above, is that the window must generally be located on a surface of the system that is positioned 90 degrees from the user interface surface where a disk is inserted by an operator. It would be desirable to locate both the user interface area and the viewing window on the same surface so that an operator could access both without the need to walk around the system housing.

Another disadvantage of the system described in U.S. Pat. No. 5,062,093 is that the optical disk insertion apparatus is powered by the mechanized handling device. Although this eliminates the need for an additional transfer device drive motor, it also necessitates that the handling device sit idle while a user is loading or unloading a disk from the transfer device. Machine efficiency would be enhanced by allowing the handling device to function independently of the transfer device.

It has also been found that users occasionally improperly insert disks into optical disk insertion devices. This may occur when a disk is placed in the device backwards or when it is not fully inserted into the device.

Thus, it would be generally desirable to provide an apparatus which overcomes these problems associated with loading an optical disk cartridge into an optical disk cartridge handling and storage system. Similar loading problems may be encountered with other types of media autochangers in which the media is provided in a cartridge-type casing, for example floppy disks, removable hard disks and tapes.

SUMMARY OF THE INVENTION

The present invention is directed to a data recording cartridge insertion apparatus such as an optical disk cartridge insertion apparatus which is adapted to be used in a data recording media storage and handling system. The apparatus is designed to be used in association with a media cartridge which has a rear end portion adapted to be inserted into a media drive and a forward end portion adapted to ordinarily be grasped by a human operator for handling the cartridge.

The cartridge insertion apparatus enables a human operator to grasp and insert a media cartridge into a forward end of the insertion apparatus in the same manner in which a cartridge is ordinarily inserted into a media drive, e.g. an optical disk reading device. The insertion apparatus reorients the hand-inserted cartridge 90 degrees to enable a mechanized handling device positioned at a side portion of the insertion apparatus to engage the forward end portion of the cartridge.

The handling device may thereafter remove the cartridge from the insertion apparatus and insert it into a selected storage location or into a drive which is associated with the storage and handling system. The 90 degree reorientation performed by the insertion apparatus enables both the user interface area and a view window to be located on the same surface of the machine thus allowing an operator to load and unload disks and view the system operation from one location.

When a cartridge is to be removed from the storage and handling system, the insertion apparatus performs the above described function in reverse, i.e. it receives a cartridge from the mechanized handling device, reorients it, and presents it forward-end-first for removal by a human operator.

A separate source of power for operating the insertion apparatus is provided so that the mechanized handling device is free to perform other functions while an operator is loading a cartridge into or unloading a disk from the insertion apparatus.

The insertion apparatus is also provided with photosensors to detect proper insertion of a cartridge within the insertion apparatus. Photosensors may also be used to detect the location of the cartridge within the insertion apparatus and to accordingly control the speed at which the cartridge is moving.

The insertion apparatus may comprise a cartridge carrier that is attached to an actuator. Both the actuator and the cartridge carrier are guided by tracks that are located on the upper portion of the insertion apparatus housing. This configuration eliminates the need to closely align the bottom and top portions of the housing during assembly and also allows the lower portion of the housing to be formed from a less expensive material.

The insertion apparatus may comprise a housing having a forward end portion, a rear end portion, and a housing longitudinal axis extending therebetween. The housing has a forward opening which is adapted for enabling hand-insertion and hand-removal of optical disk cartridges by a human operator. The housing has a side opening for enabling machine-insertion and machine-removal of cartridges by a mechanized cartridge handling device.

DETAILED DESCRIPTION OF THE PREFERRED EMBODIMENT OF THE INVENTION

In General

Figure 1:
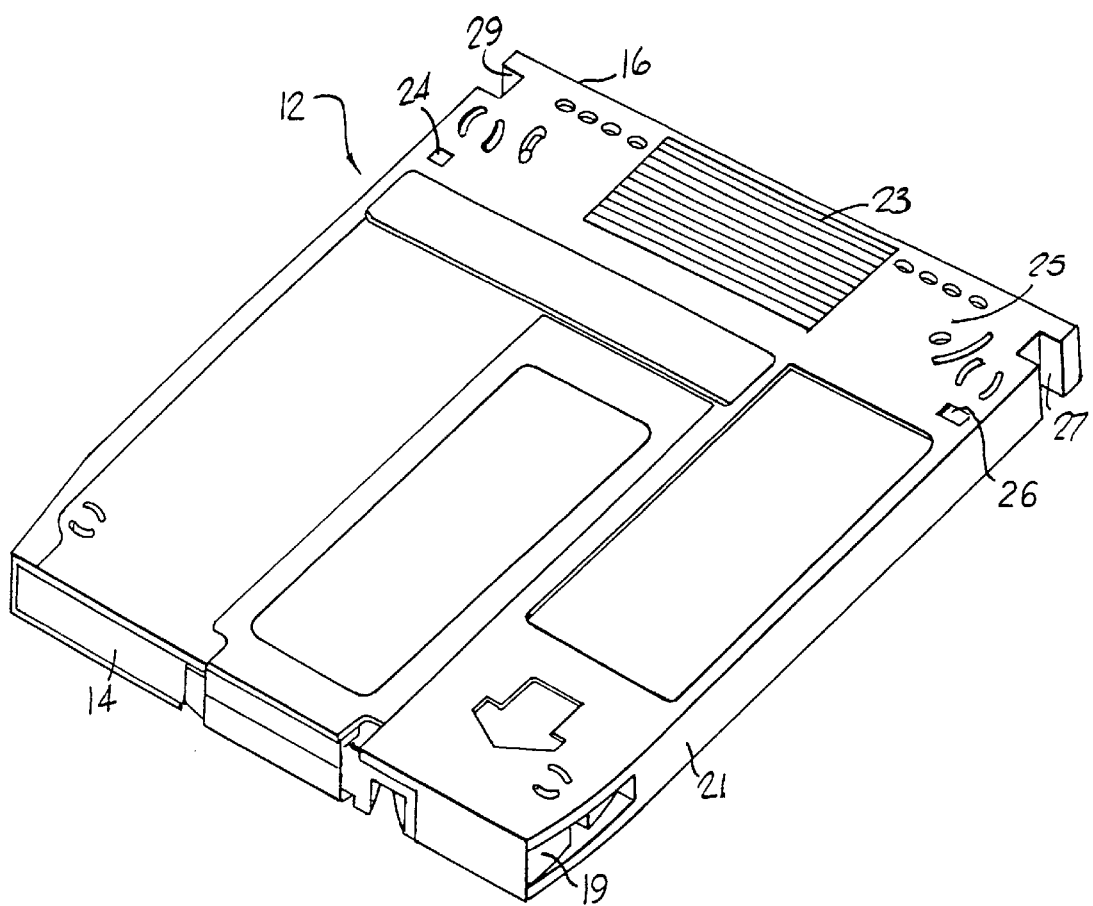
FIG. 1 is a perspective view of a conventional optical disk cartridge.
Figure 2:
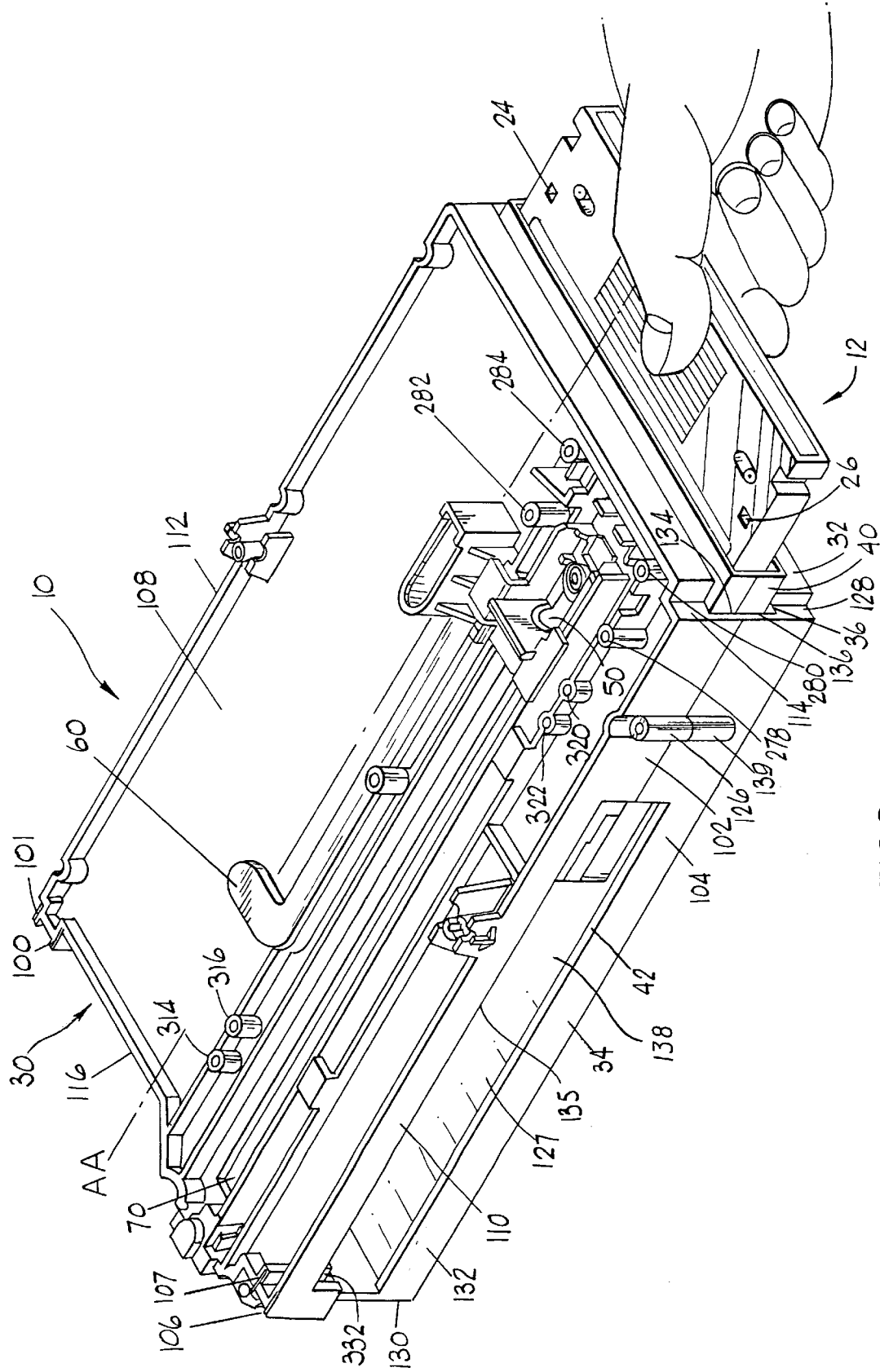
FIG. 2 is front perspective view of an optical disk insertion apparatus.
Figure 3:
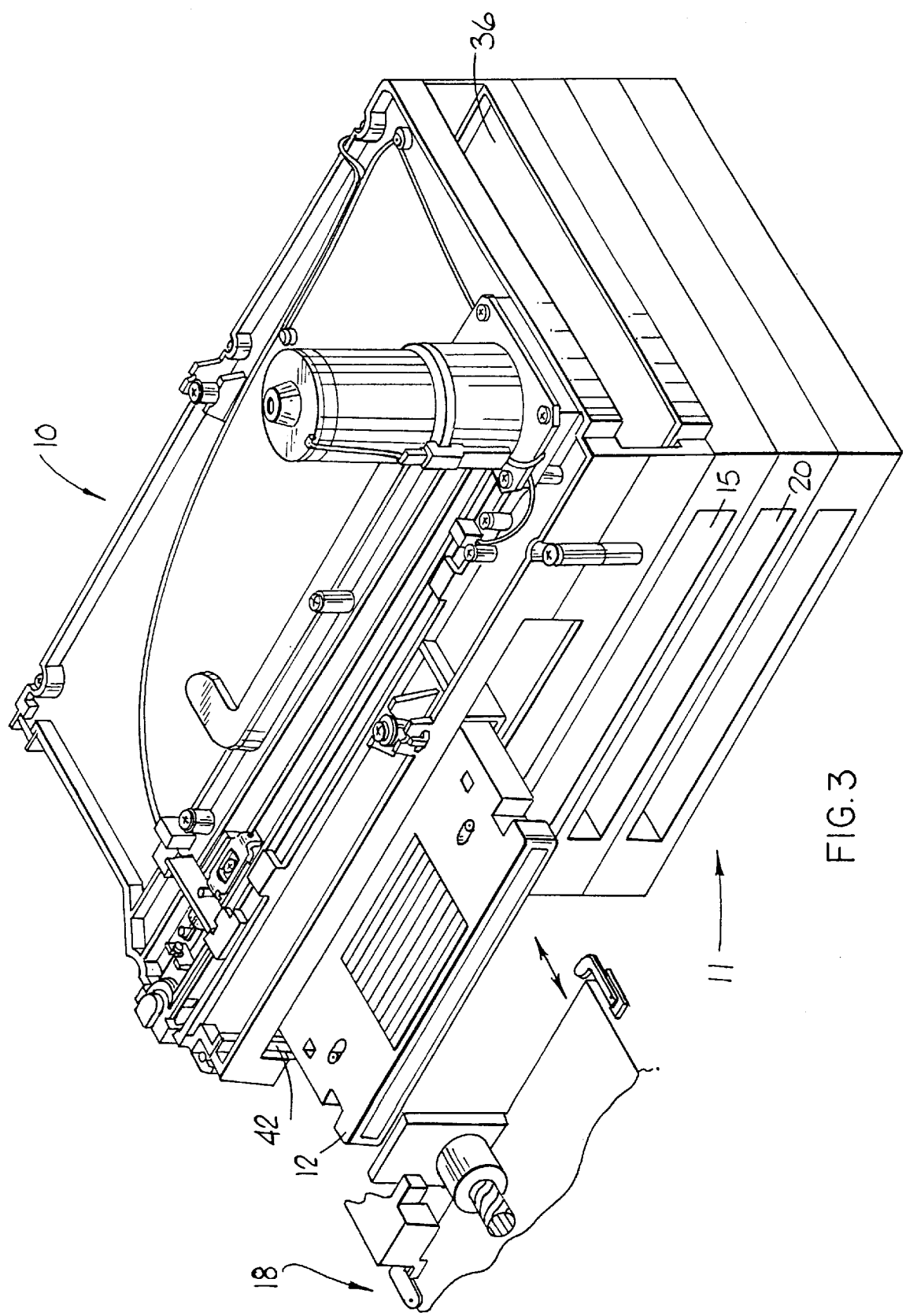
FIG. 3 is rear perspective view of an optical disk insertion apparatus and portions of an associated optical disk storage and handling system.

FIGS. 2 and 3 illustrate an optical disk cartridge insertion apparatus 10 which is adapted to be used in an optical disk storage and handling system 11. The apparatus 10 is designed to be used in association with a conventional optical disk cartridge 12, FIG. 1. Cartridge 12 has a rear end portion 14 which is adapted to be inserted into an optical disk reading device 15 and has a forward end portion 16 which is adapted to ordinarily be grasped by a human operator for inserting and removing the cartridge from an optical disk reading device. The cartridge insertion apparatus 10 enables a human operator to grasp and insert an optical disk cartridge 12 into a forward end 32 of the insertion apparatus in the same manner in which a cartridge is ordinarily inserted into an optical disk reading device. The insertion apparatus 10 angularly reorients the hand-inserted cartridge to enable a mechanized handling device 18 positionable at a side portion 34 of the insertion apparatus to engage the forward end portion 16 of the optical disk cartridge. The handling device may thereafter remove the cartridge from the insertion apparatus 10 and insert it into a selected storage location 20 or into an optical disk reading device 15 associated with the storage and handling system without angularly reorienting the cartridge. When a cartridge is to be removed from the storage and handling system, the insertion apparatus 10 performs the above described function in reverse, i.e. it receives a cartridge at its side portion 34 from the mechanized handling device 18, reorients it, and presents it forward-end-first for removal by a human operator at its forward end 32.

The insertion apparatus 10 comprises a housing 30 having a forward end portion 32, a side portion 34, and a housing longitudinal axis AA. The housing 30 has a forward opening 36 which is adapted for enabling hand-insertion and hand-removal of optical disk cartridges 12 by a human operator. The housing 30 has a side opening 42 for enabling machine-insertion and machine-removal of cartridges by a mechanized cartridge handling device 18.

Figure 5:
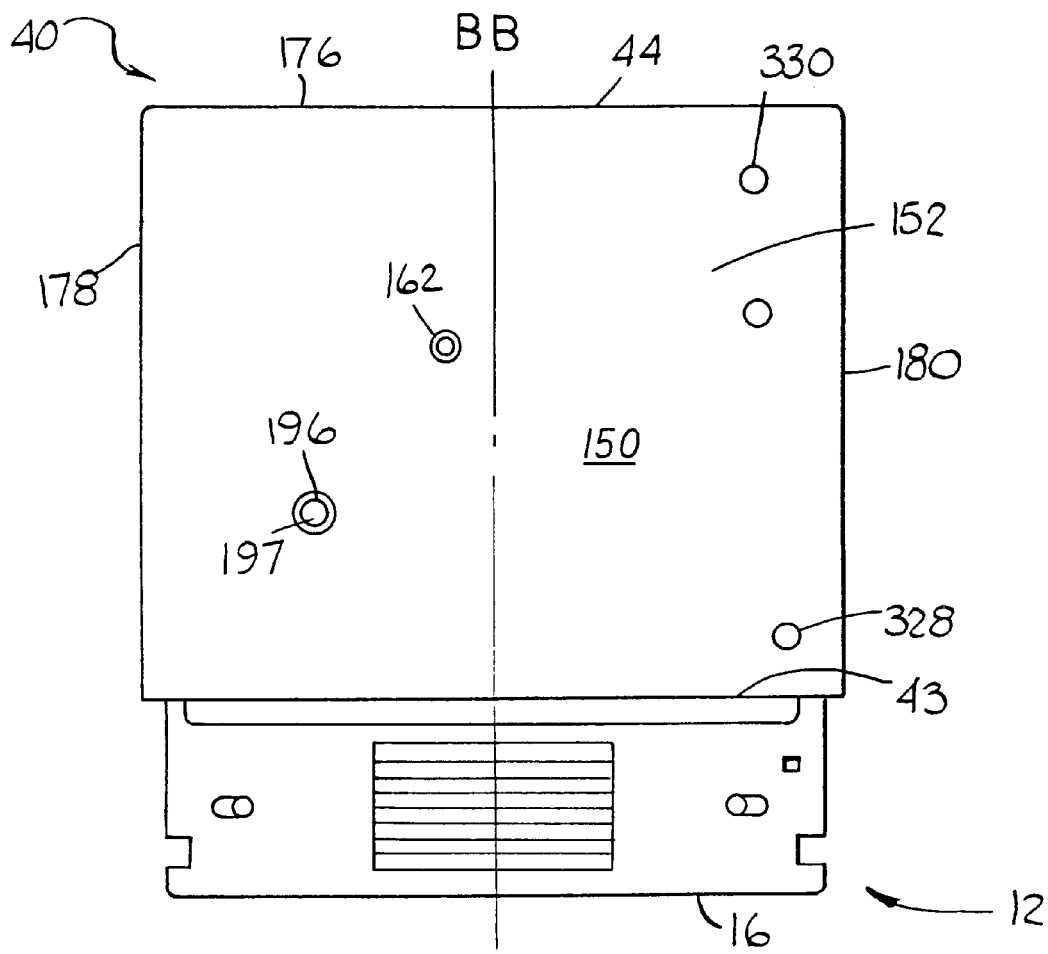
FIG. 5 is top plan view of an optical disk cartridge carrier with a disk inserted.
Figure 6:
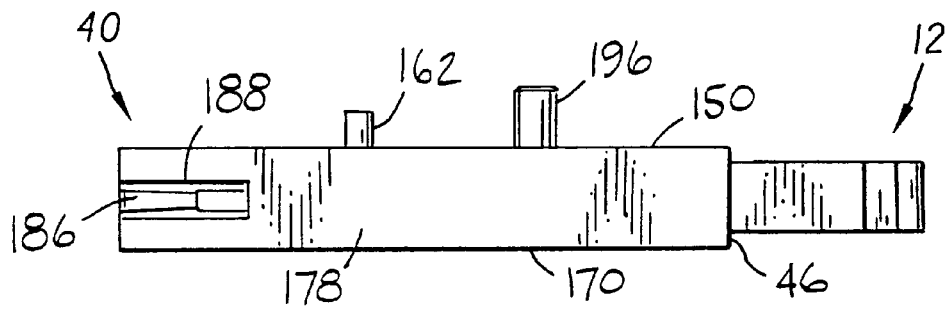
FIG. 6 is a side elevation view of the optical disk cartridge carrier of FIG. 5.

The insertion apparatus 10 also comprises a cartridge carrier 40, FIGS. 5 and 6, which is supported by the housing 30 in angularly and longitudinally displaceable relationship with the housing 30. The cartridge carrier is adapted for receiving a cartridge 12 therein and for holding the cartridge in stationary relationship therewith. The cartridge carrier has a central longitudinal axis BB extending between a forward end portion 43 and a rear end portion 44 thereof which is positionable in coaxial relationship with housing longitudinal axis AA. As illustrated in FIG. 5, the cartridge carrier 40 is adapted to have the forward end portion 16 of the cartridge 12 positioned proximate its forward end portion 43 and to have the rear end portion 14 of the cartridge positioned proximate its rear end portion 44 when a cartridge is properly received therein. The carrier has a forward end opening 46 which is adapted to enable insertion and removal of cartridges 12. The cartridge carrier has a first operating position, FIGS. 2 and 7, in which it is located during hand-insertion and hand-removal of cartridges wherein the forward end portion 43 of the carrier is positioned proximal the forward end portion 32 of the housing 30. The carrier has a second operating position, FIGS. 3 and 8, in which it is located during machine-insertion and machine-removal of cartridges. In the second operating position, the forward end portion 43 of the carrier is positioned proximal the side portion 34 of the housing 30. In the illustrated embodiment, the carrier second operating position is rotated 90° from the first operating position.

Figure 7:
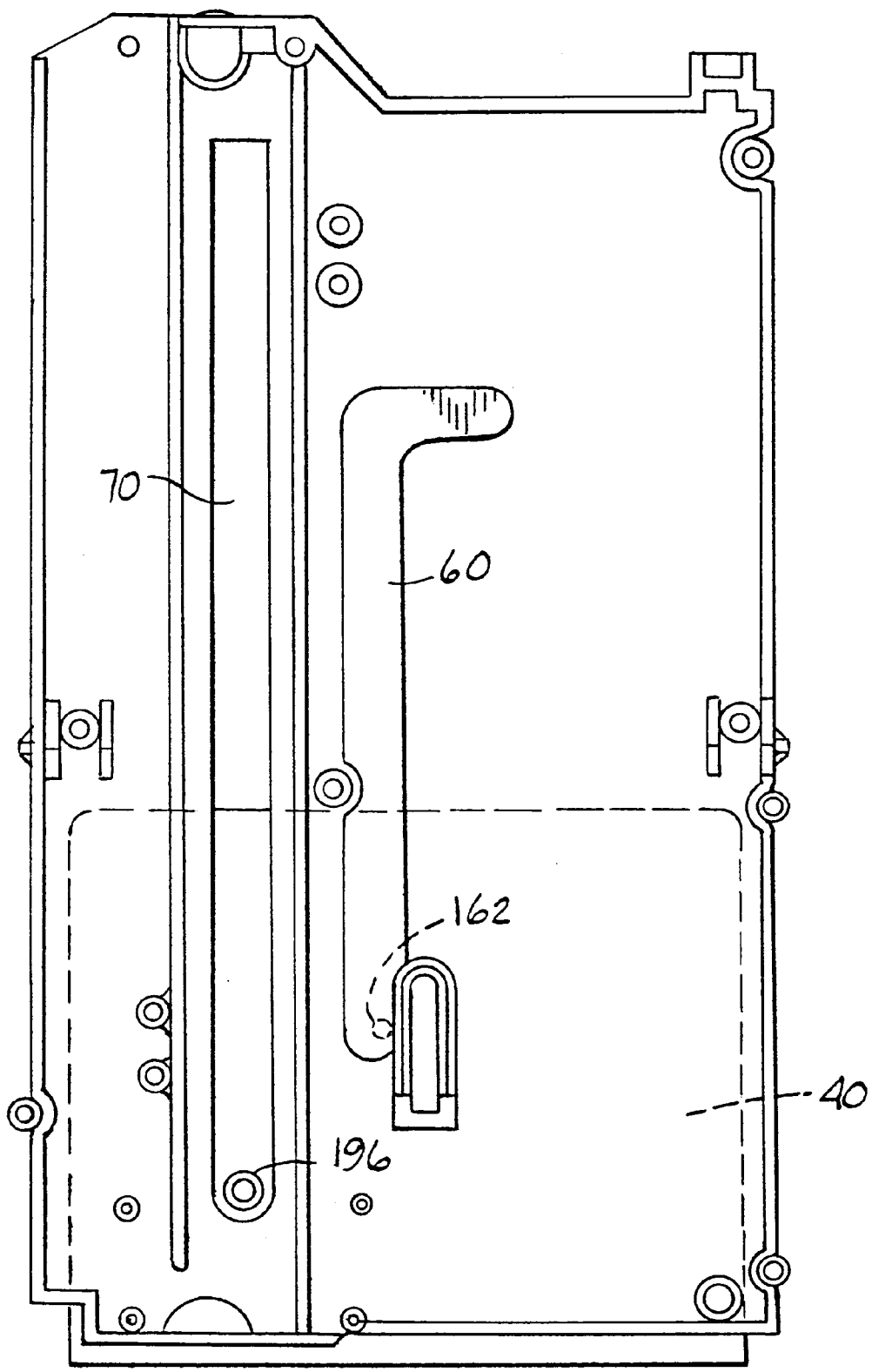
FIG. 7 is a top plan view of an upper housing member and an optical disk cartridge carrier located in a first operating position.
Figure 8:
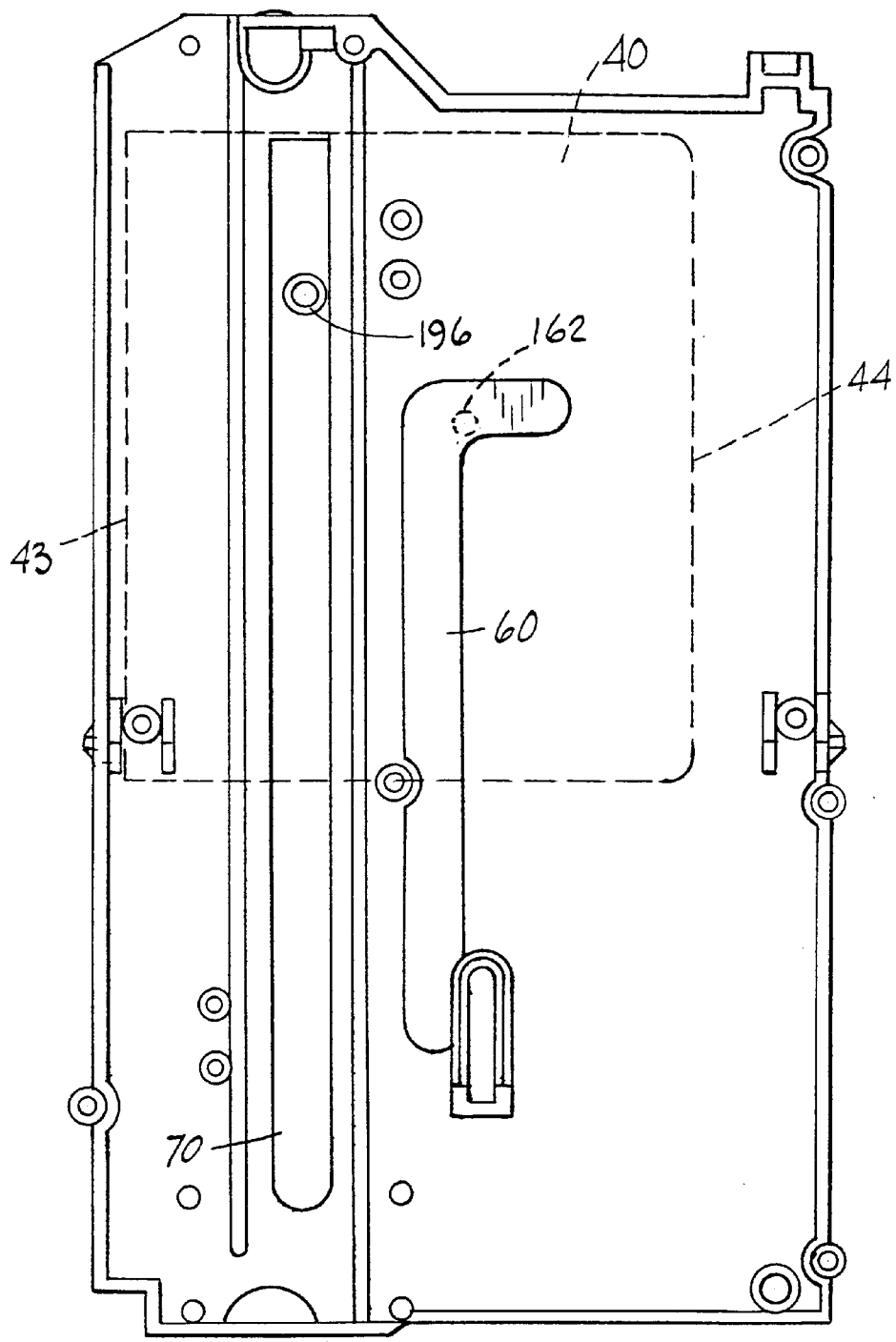
FIG. 8 is a top plan view of an upper housing member and an optical disk cartridge carrier located in a second operating position.

Referring again to FIG. 2, the insertion apparatus 10 further comprises an actuator 50 which is operably connected to the cartridge carrier 40 for moving the cartridge carrier between the first operating position, FIG. 7, and the second operating position, FIG. 8, thereof.

Figure 4:
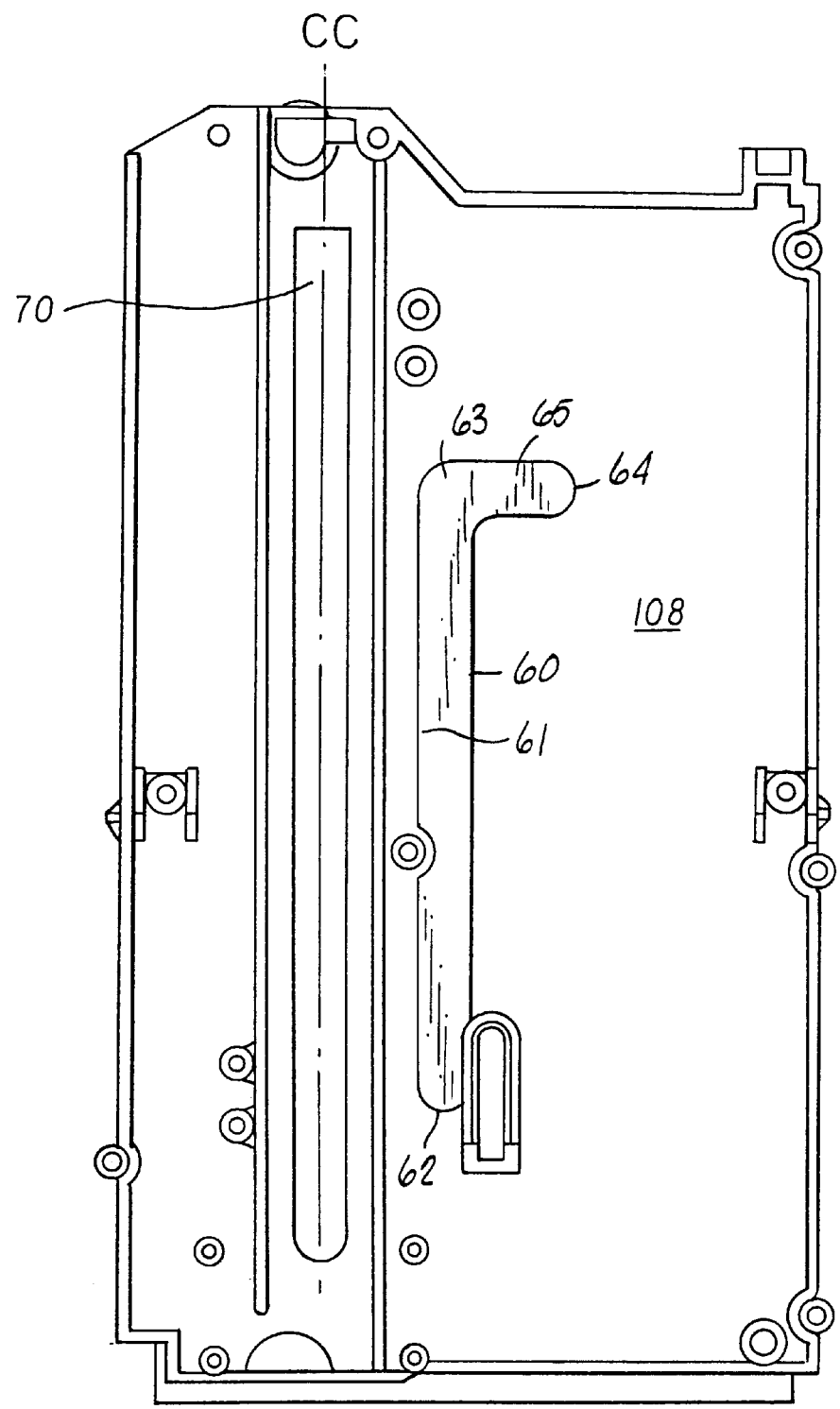
FIG. 4 is a top plan view of an upper housing member.

The apparatus 10 also includes a track 60 having a forward end portion 62 and a rear end portion 64, FIG. 4. The track is fixedly associated with the housing 30 and is operably associated with the cartridge carrier 40 for guiding the movement of the carrier 40 relative the housing 30.

Figure 9:
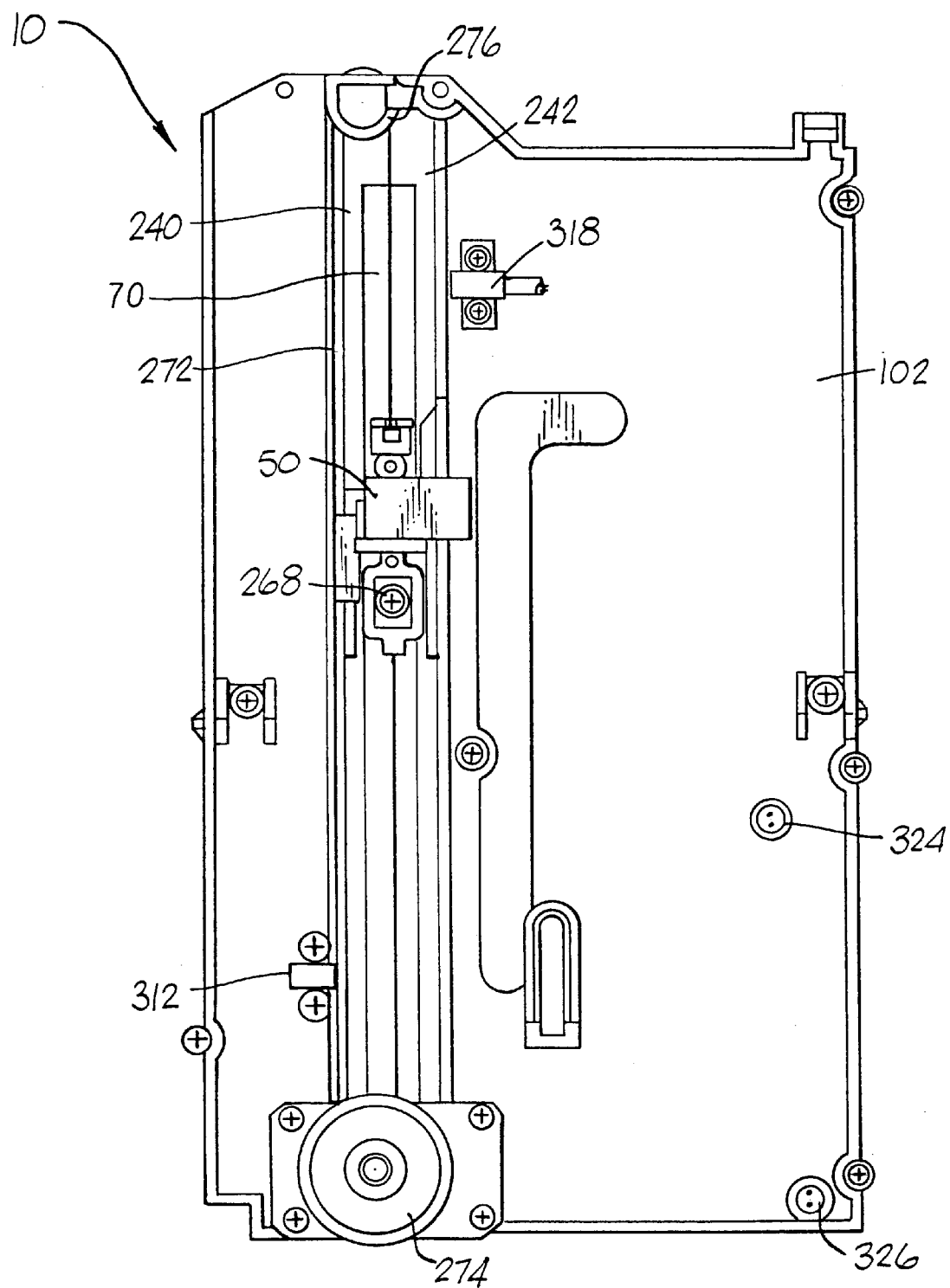
FIG. 9 is a top plan view of an optical disk insertion apparatus.

An actuator guide 70, FIGS. 2, 4 and 9, is provided for limiting the movement of the actuator 50 relative to the housing 30 to an actuator path having a central longitudinal axis CC extending parallel to the housing longitudinal axis AA.

Having thus described the insertion apparatus 10 in general, various features of the apparatus will now be described in further detail.

Optical Disk Cartridge

A conventional optical disk cartridge is illustrated in FIG. 1. The optical disk cartridge has a rear end portion 14 which is adapted to be inserted into an optical disk reading device and a forward end portion 16 which is adapted to be grasped by a human operator for handling the cartridge. Conventional optical disk cartridges in use in the United States for computer applications have a generally parallelepiped shape with a thickness (height) of approximately 0.4 inches, a length of approximately 6 inches, and a maximum width of approximately 5.3 inches. The rear end portion 14 of an optical disk cartridge tapers in width somewhat in approximately the last 0.5 inch of axial length thereof from a maximum lateral dimension of 5.3 inches to a minimum lateral dimension of approximately 5.1 inches at the terminal end thereof. Each optical disk has symmetrically positioned recesses 19 (only one shown) in the lateral sidewalls 21 (only one shown) thereof which are adapted for engaging a portion of a reading device. The forward end of a conventional optical disk cartridge has a centrally positioned ribbed surface 23 (only one shown) on both a top 25 and bottom surface (not shown) thereof. Each optical disk also comprises a first rectangular groove 27 and a second rectangular groove 29 in a forward portion of the lateral sidewalls which are adapted to be engaged by portions of conventional reading devices for locating and holding the cartridge in the reading device. An optical disk may also include holes 24 and 26 which may be used for proper orientation detection.

Housing

Referring to FIG. 2, housing 30 may comprise an upper housing member 102 and a lower housing member 104. The upper housing member 102 has a top panel portion 108, first and second lateral sidewalls 110, 112, a front wall 114, and a rear wall 116.

The front wall 114 includes a laterally extending opening 134 therein which may have a lateral dimension of, e.g. 145.4 mm and a height of, e.g. 10 mm. The side wall 110 includes an opening 135 therein, which may be, e.g., 184.39 mm wide and, e.g. 10 mm high.

The peripheral walls 110, 112, 114, 116 of the upper housing member 102 may include vertically extending bores 126 which are adapted to receive screws for attaching the upper housing member 102 to the lower housing member 104. The upper housing member 102 also contains the track 60 and the actuator guide 70.

The lower housing member 104, as best illustrated in FIG. 2, comprises a bottom panel 127, a front wall 128, a rear wall 130, a first lateral sidewall 132 and a second lateral sidewall, not shown. The front wall 128 includes a laterally extending opening 136 therein which may have a lateral dimension of, e.g. 145.4 mm and a height of, e.g. 11.8 mm. The side wall 132 has an opening 138 therein, which may be, e.g., 184.39 mm wide and, e.g. 11.8 mm high.

The peripheral walls 128, 130, 132 of the lower housing member 104 may comprise bores 139 therein adapted to threadingly accept screws or the like for attaching the upper housing member 102 to the lower housing member 104. The upper and lower housing members, when attached, define a generally parallelepiped-shaped cavity which may have a lateral dimension of, e.g., 145.4 mm, a longitudinal dimension of, e.g., 257.2 mm, and a height of, e.g., 21.8 mm.

The front opening 134 in upper housing member 102 and the front opening 136 of lower housing member 104 cooperate to form the front opening 36 in the housing 30 when the upper housing member 102 and the lower housing member 104 are assembled. Similarly, the side opening 135 in upper housing member 102 and the side opening 135 of lower housing member 104 cooperate to form the side opening 42 in the housing 30 when the upper housing member 102 and the lower housing member 104 are assembled. When upper housing member 102 and lower housing member 104 are assembled, the front opening 36 may have a lateral dimension of, e.g., 145.4 mm and a height of, e.g., 21.8 mm. The side opening 42 may have a lateral dimension of, e.g., 184.39 mm and a height of, e.g., 21.8 mm.

As will be explained in more detail, all of the insertion device sliding members (track 60 and actuator guide 70) are located in the upper housing member 102. Accordingly, it is desirable to construct the upper housing member 102 from a durable, high-strength plastic, such as polycarbonate with 15% carbon and 15% PTFE, in order to resist wear induced by the sliding members. Since the lower housing member 104 contains no sliding members, it may be constructed of a less expensive plastic such as polycarbonate with a 20% fiberglass filler.

The housing 30 may also be provided with crush bumps 100, 101, 106, 107 located on upper housing member 102, FIG. 2. These crush bumps facilitate installation of the housing into the optical disk storage and handling system 11. When the housing 30 is inserted into a closely fitting handling system receptacle, the crush bumps 100, 101, 106, 107 are able to shear away to configure to the exact size of the receptacle. This greatly facilitates alignment between the housing 30 and its associated handling system 11. Similar crush bumps, not shown, may also be provided on the lower housing member 104.

Cartridge Carrier

As illustrated in FIGS. 5 and 6, the cartridge carrier 40 comprises an upper member 150 and a lower member 170. Upstanding rear wall 176 and two upstanding lateral sidewalls 178, 180 connect the upper member 150 to the lower member 170. Cartridge carrier 40 may have a longitudinal length of, e.g., 118.04 mm and a lateral width of, e.g., 142.1 mm, as viewed in FIG. 5.

The upper member 150 of cartridge carrier 40 comprises a generally flat, horizontal panel 152. The upper member 150 also comprises an upstanding stud member 162 which is adapted to ride in track 60, as described in further detail below.

Stud 162 may have a diameter of, e.g., 5.8 mm and an axial length of, e.g., 5.1 mm. Stud 162 may be located at a longitudinal distance of about 74.19 mm rearwardly of the forward edge portion of member 152 and at a lateral distance of about 62.37 mm from the left side of member 152, as viewed in FIG. 5.

Upper member 150 also has a connection stud 196, FIG. 5, projecting from the top thereof. The projection stud 196 may have a diameter of, e.g., 7.0 mm and an axial length of, e.g., 9.0 mm and may be located on the upper member 152 at a longitudinal distance of 39.19 mm from the forward edge of the upper member and a lateral distance of 37.55 mm from the left side of upper member 152, as viewed in FIG. 5. Stud 196 contains a threaded opening 197 which allows attachment of the carrier 40 to the actuator 50.

Leaf springs 186 may be provided at the rear of carrier 40. The leaf spring 186 projects into a cutout portion 188 in sidewall 178 and has a laterally projecting portion thereon which is adapted to engage the rear sidewall recess 19, FIG. 1, of an optical disk 12 which is received in the carrier 40. A similar leaf spring, not shown, may also be provided in sidewall 180. The spacing between the two sidewalls 178, 180 may be, e.g., 135.4 mm and the spacing between the upper member 150 and the lower member 170 may be, e.g., 12 mm. This spacing allows a cartridge 12 to be received in close-fitting, sliding relationship within the cartridge carrier 40.

Track

As best illustrated in FIG. 4, the upper housing member 102 top panel 108 has a generally longitudinally extending track 60. The track 60 has a constant width, e.g., 6.14 mm, and is adapted to receive the carrier stud 162 therein. The track 60 has a forward end 62 and a rear end 64. The forward end 62 is positioned approximately 58 mm rearwardly of the forwardmost edge of top panel 108 and approximately 67.55 mm from the left side of top panel 108, as viewed in FIG. 4. The rear end 64 is positioned approximately 196.76 mm rearwardly of the forwardmost edge of upper top panel 108 and approximately 94.79 mm from the left side of top panel 108, as viewed in FIG. 4. The track 60 comprises a first straight portion 61 which is positioned parallel to housing axis AA. The track 60 comprises an arcuate second portion 63 which has an inner radius of about 6 mm and an outer radius of about 9.13 mm. The track has a straight third portion 65 beginning at the end of the arcuate second portion 63 and ending at the track rear end 64. Track straight third portion 65 extends in substantially perpendicular fashion to track portion 61.

Actuator guide

As best illustrated in FIGS. 2 and 9, actuator guide 70 may be integrally formed with the top surface of housing upper member 102. The actuator guide may comprise first and second L-shaped longitudinally extending members 240, 242, FIG. 9, which are adapted to longitudinally slidingly receive actuator 50 therewithin and guide it along a longitudinally extending path. The guide members 240, 242 may be integrally formed with the top housing member 102.

As previously described, both the track 60 and the actuator guide 70 are located on the housing upper member 102. Since no guidance structure is located on the housing lower member 104, alignment between the housing upper member 102 and the housing lower member 104 is not critical. This allows for much easier manufacturing of the insertion apparatus 10.

Actuator

As best illustrated in FIGS. 2 and 9–11, the actuator 50 may comprise a generally parallelepiped-shaped member having a body portion 250. The actuator has a bottom surface portion 254 and a plurality of generally vertically extending lateral side surfaces 256, 258, 260, 264. The actuator may also be provided with a rearwardly extending member 261 having an outer surface 262.

In operation, the bottom surface portion 254 of the actuator 50 is slidingly guided along the bottom portions of the L-shaped members 240, 242 of the track 60. The side surfaces 256 and 258 of the actuator 50 fit within the upright portions of the L-shaped members 240 and 242. In this manner, the actuator 50 is restricted from vertical and lateral movement and, thus, constrained to longitudinal movement along the track 60. The actuator 50 may have a lateral dimension of about 20 mm from side surface 256 to side surface 258. The track 60 may have a lateral dimension of about 20.4 mm between the upright portions of its L-shaped members 240 and 242.

A hole 266 is provided in the bottom surface 254 of the actuator 50. A bolt 268, FIG. 9, or other connection mechanism is passed through the hole 266 and engages with the threaded opening 197 of the cartridge carrier connector stud 196. In this manner, the actuator 50 may be connected to the cartridge carrier 40 and movement of the actuator 50 along the actuator guide 70 will cause movement of the cartridge carrier between the positions shown in FIGS. 7 and 8.

A projection 270 is provided on the bottom surface 254 of actuator 50 to ensure that adequate clearance is maintained between the bottom surface 254 of the actuator 50 and the top panel 152 of the cartridge carrier 40. This clearance allows the actuator-cartridge carrier assembly to freely slide along the lower portion of the L-shaped members 240 and 242. Hole 266 passes through the projection 270 and, when the actuator 50 is attached to the cartridge carrier 40 with the bolt 268, the stud 196 of the cartridge carrier fits into this hole and the projection 270 abuts the top panel 152 of the cartridge carrier. Projection 270, and thus the clearance described above, may extend for a distance of about 3 mm.

The actuator 50 also includes a front connector 271 and a rear connector 273. These connectors are used to attach the actuator 50 to opposite ends of a wire rope 272, FIG. 9. Wire rope 272 may be include a steel wire core member having a diameter of, e.g., 0.610 mm surrounded by a coating, such as a nylon coating. The diameter of the wire rope, including such a nylon coating may be, e.g., 0.760 mm. This coating may be provided in order to reduce slippage between the wire rope and the motor drive pulley as described below and to extend the life of various pulleys within the system. Wire rope 272 may have a length of about 557.8 mm and may be of a type commercially available from Sava Industries of No. 4 North Corporate Drive, P.O. Box 30, Riverdale, N.J.

Wire rope 272 is driven by a pulley, not shown, which is attached to motor 274, FIG. 9, in a conventional manner. Wire rope 272 also passes around an idler pulley 276 located at the rear of the insertion apparatus 10. Motor 274 may be attached by screws to the bores 278, 280, 282, 284 located in the top panel 108 of upper housing member 102, FIG. 2. Motor 274 may be an 18 volt DC motor and may include a reducing gear mechanism which may provide, e.g. a 19.53:1 reduction. As can be appreciated, operation of the motor 274 will cause movement of the wire rope 272 and, thus movement of the actuator 50 and the attached cartridge carrier 40.

Figure 10:
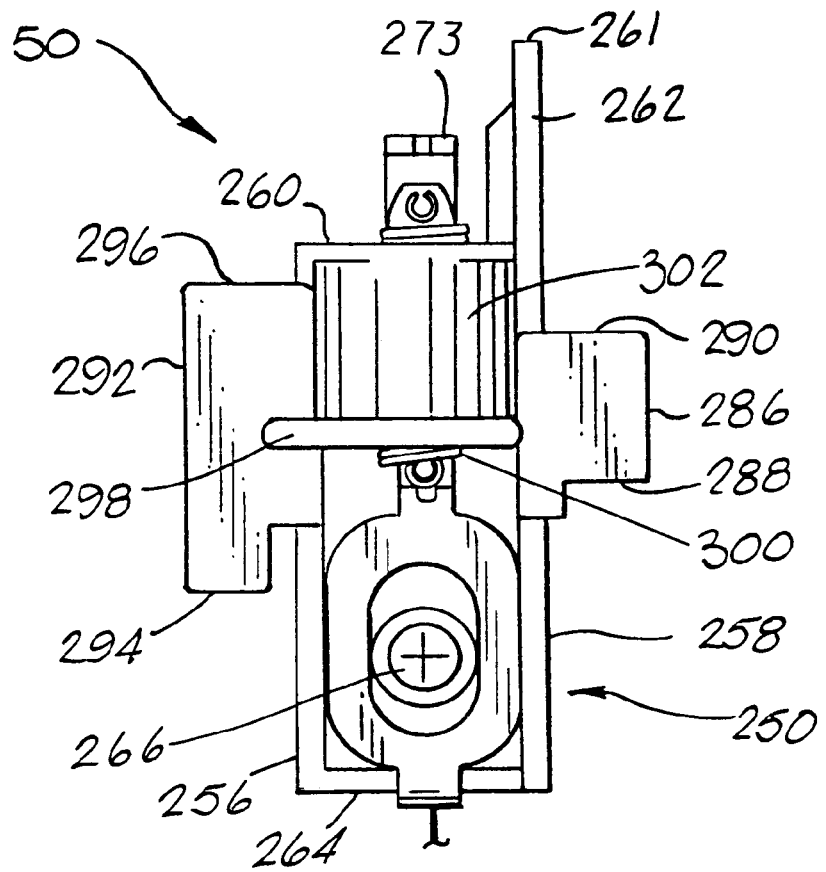
FIG. 10 is a top plan view of an actuator used in the optical disk insertion apparatus of FIG. 9.
Figure 11:
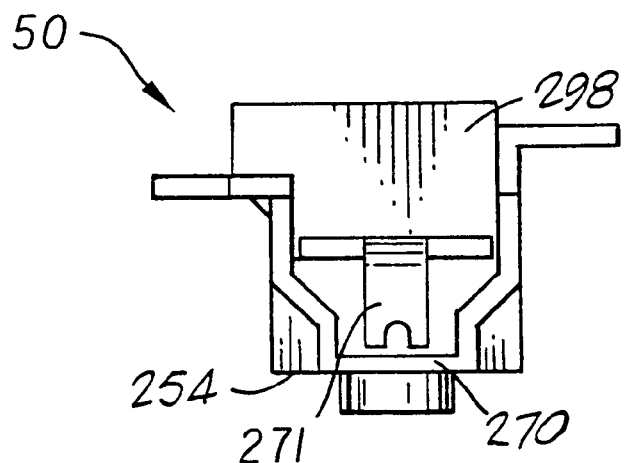
FIG. 11 is a front elevation view of the actuator of FIG. 10.

Referring to FIGS. 10 and 11, actuator 50 may also include first and second tabs 286 and 292. First tab 286 has a front edge 288 and a rear edge 290. In a similar fashion, second tab 292 has a front edge 294 and a rear edge 296. These tabs are used for actuator control as will be explained in more detail. A transverse member 298 is provided between the tabs 286 and 292 and provides additional strength and rigidity to the tabs.

Actuator 50 may also include a spring 300 for maintaining the proper tension in the wire rope 272. A cylindrical portion 302 of the actuator 50 may be provided to house the spring 300.

As previously described, the cartridge carrier 40 is attached to the actuator 50 only by the connector stud 196, FIG. 5. Since the connector stud is not located at the center of gravity of the cartridge carrier, the side 180 of cartridge carrier 40 remote from the connector stud may tend to sag slightly. Although this is not a problem while the cartridge carrier is being shuttled back and forth, it may become a problem when the cartridge carrier is located in the user access position, FIGS. 2 and 7, or the handling device access position, FIGS. 3 and 8. To alleviate this problem, a ramp 332 may be provided at the side opening 42 of the housing 30. This ramp pushes down on the left side (as viewed in FIG. 2) of the cartridge carrier 40 as the cartridge carrier moves into the handling device access position. This downward force lifts the opposite sagging side and causes the cartridge carrier 40 to assume a properly aligned configuration. The ramp may have a height of about 1.1 mm.

A similar ramp, not shown, may also be provided at the left side of the forward opening 36 of the housing 30 to cause the cartridge carrier to assume a properly aligned configuration at the operator access end portion of the insertion apparatus 10.

Actuator Control

Figure 12:
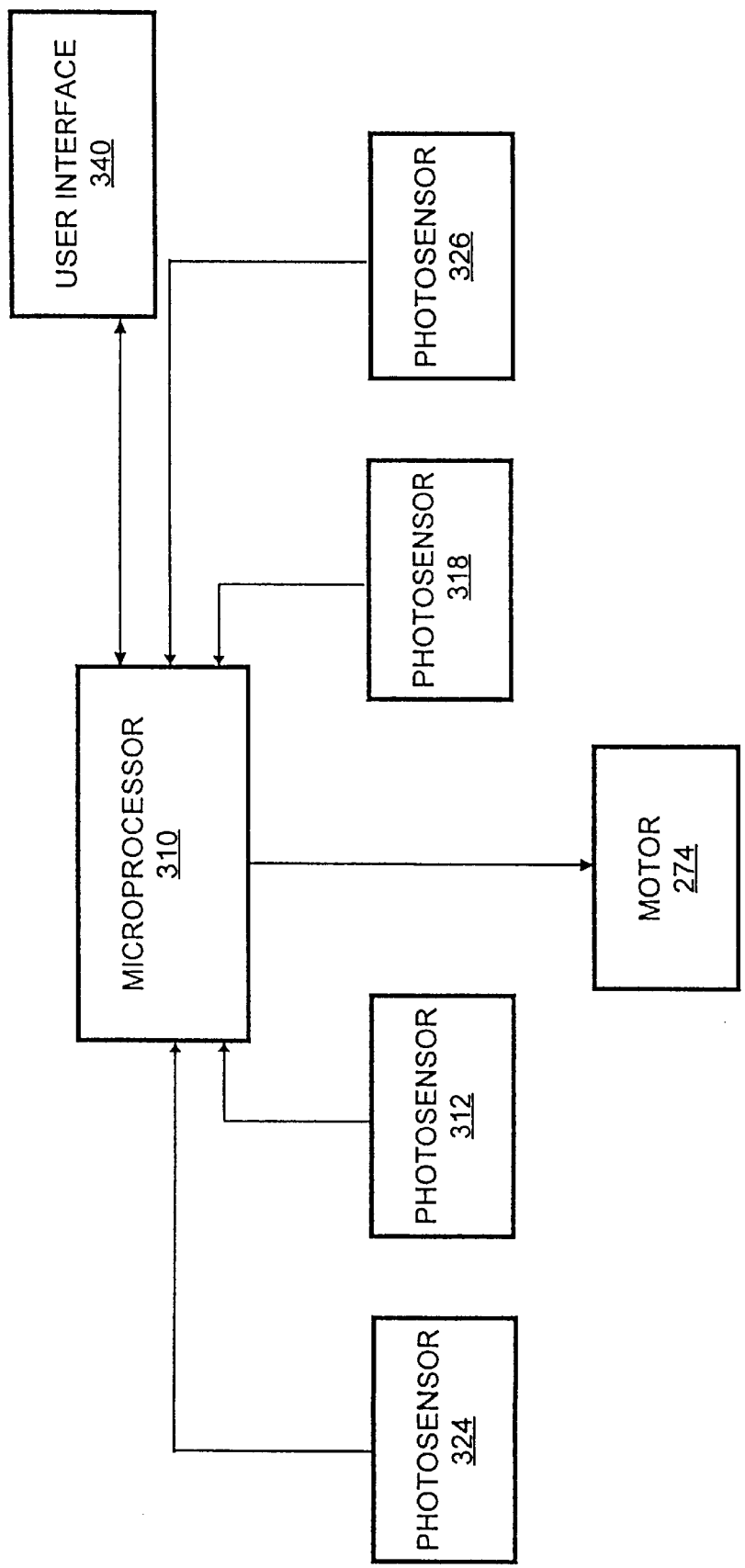
FIG. 12 is a schematic illustration of a control system for an optical disk insertion apparatus.

The movement of actuator 50 and the attached cartridge carrier 40 is controlled by a microprocessor 310, FIG. 12. As best shown in FIG. 9, front actuator photosensor 312 and rear actuator photosensor 318 are provided along the actuator guide 70. Front actuator photosensor 312 may be attached by screws to the bores 314 and 316 located on the top panel 108 of upper housing member 102, FIG. 2. Rear actuator photosensor 318 may be attached by screws to the bores 320 and 322 located on the top panel 108 of upper housing member 102. The photosensors 312 and 318 may be of the type commercially available from Omron Electronics of 1 East Commerce Drive, Schaumburg, Ill. and sold as part number EESV3-DS.

The photosensors 312 and 318 are positioned to overlie the path of actuator tabs 292 and 286 respectively. In this manner, the photosensor 312 can sense the front and rear edges 294, 296 of the actuator tab 292. In a similar manner, the photosensor 318 can sense the front and rear edges 288, 290 of the actuator tab 286.

When the actuator 50 is moving in a forward direction, detection of the front edge 294 of tab 292 by the photosensor 312 causes the microprocessor 310 to begin decelerating the motor 274. When the rear edge 296 is subsequently detected by photosensor 312, the microprocessor 310 stops the motor. At this point, the actuator 50, along with the cartridge carrier 40, are in their fully forward positions.

When the actuator 50 is moving in a rearward direction, detection of the rear edge 290 of tab 286 by the photosensor 318 causes the microprocessor 310 to begin decelerating the motor 274. When the front edge 288 is subsequently detected by photosensor 318, the microprocessor 310 stops the motor. At this point, the actuator 50, along with the cartridge carrier 40, are in their fully rearward positions.

Proper Cartridge Insertion Detection

In order to detect proper insertion of the cartridge 12 into the cartridge carrier 40 by a user, a front insertion detection photosensor 324 and a rear insertion detection photosensor 326 are provided, FIG. 9. Each photosensor 324, 326 is inserted into a hole that extends completely through the top panel 108 of upper housing member 102. A corresponding light source, not shown, is provided in the bottom panel 127 of lower housing member 104 directly beneath each photosensor 324, 326.

Holes 328 and 330 are provided in cartridge carrier 40, FIG. 5. When actuator 50 and cartridge carrier 40 are in the fully forward position (when the rear edge 296 of tab 292 is detected by front actuator photosensor 312), the insertion detection photosensors 324 and 326 will be aligned with the cartridge carrier holes 330 and 328, respectively. If a cartridge is fully loaded into the cartridge carrier, the photosensors 324 and 326 will detect no light since the loaded cartridge will block the light sources located on the bottom surface of lower housing member 104.

Once both photosensors detect that a cartridge is fully loaded (i.e., no light is detected), the microprocessor 310 causes the actuator 50 to move rearwardly until the front edge 294 of tab 292 of the actuator 50 is detected by actuator photosensor 312. In this position, the rear insertion detection photosensor 324 will still be blocked from its light source. The front insertion detection photosensor 326, however, will be aligned with the hole 24 in the cartridge 12 if the cartridge is inserted properly. The photosensor 326 will, thus, detect light from its light source if the cartridge is properly inserted. If the cartridge is not fully inserted or if it is inserted backward (i.e., with its forward end 16 into the cartridge carrier 40), then the photosensor 326 will not be aligned with the hole 24 and will not detect light indicating that an error condition exists.

If such an error condition exists, the microprocessor 310 will return the cartridge carrier to the fully forward position and alert the user that the cartridge is not inserted properly. If no error condition exists, then microprocessor 310 will continue rearward movement of the cartridge carrier 40 and the properly inserted cartridge.

The photosensors 324 and 326 may also be used to indicate when an optical disk has been successfully unloaded from the cartridge carrier 40 by an operator. After returning to the first operating position with a disk to be unloaded, the transfer apparatus will wait for the operator to remove the disk from the cartridge carrier. When both photosensors 324 and 326 detect light, the microprocessor 310 knows that the disk has been successfully removed. At this point, the cartridge carrier may be returned to the second position to receive another disk from the handling device 18.

Operation

Figure 13A:
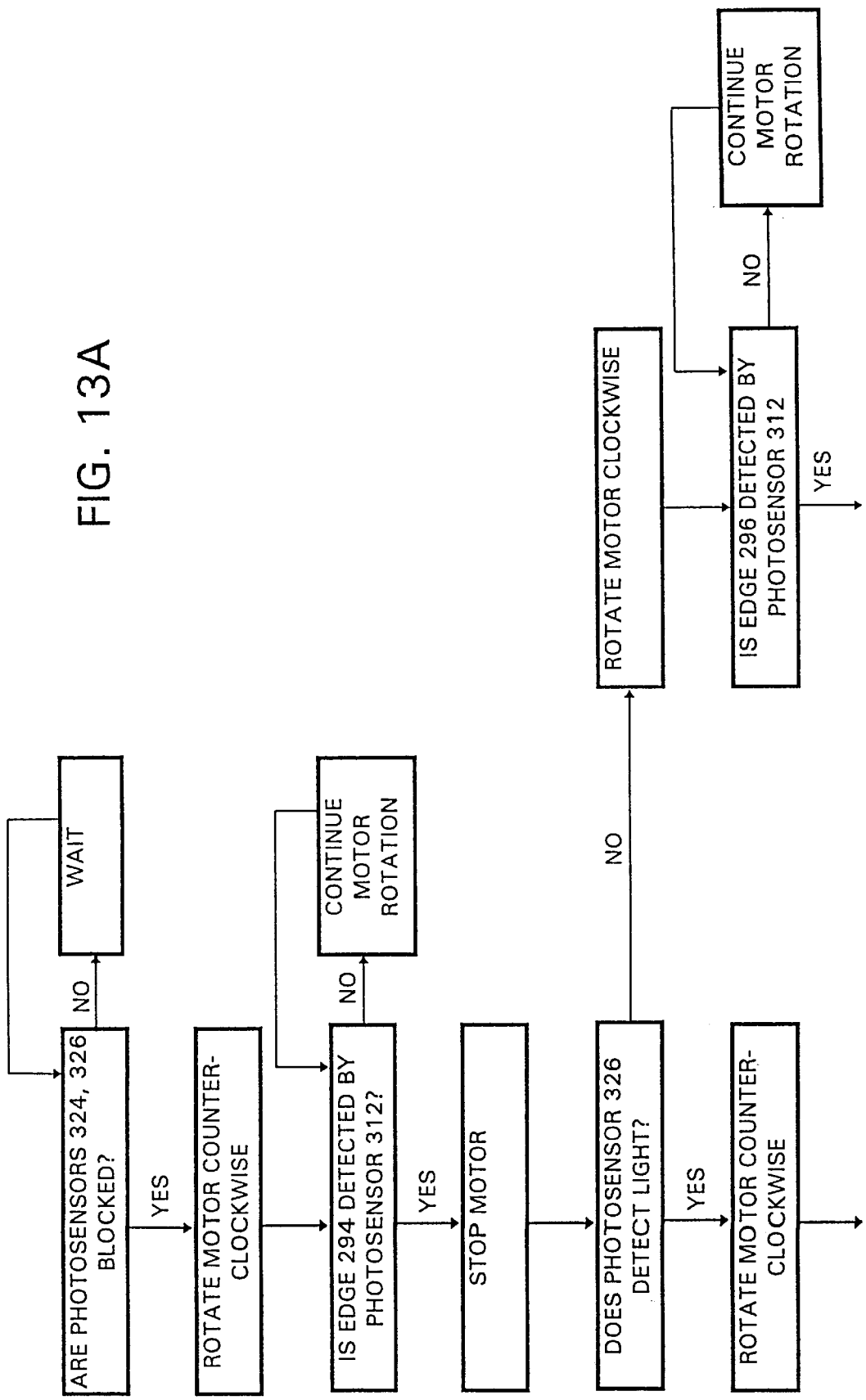
FIG. 13A is a block diagram illustrating the operation of an optical disk insertion apparatus when inserting a disk into an optical disk storage and handling system.
Figure 13B:
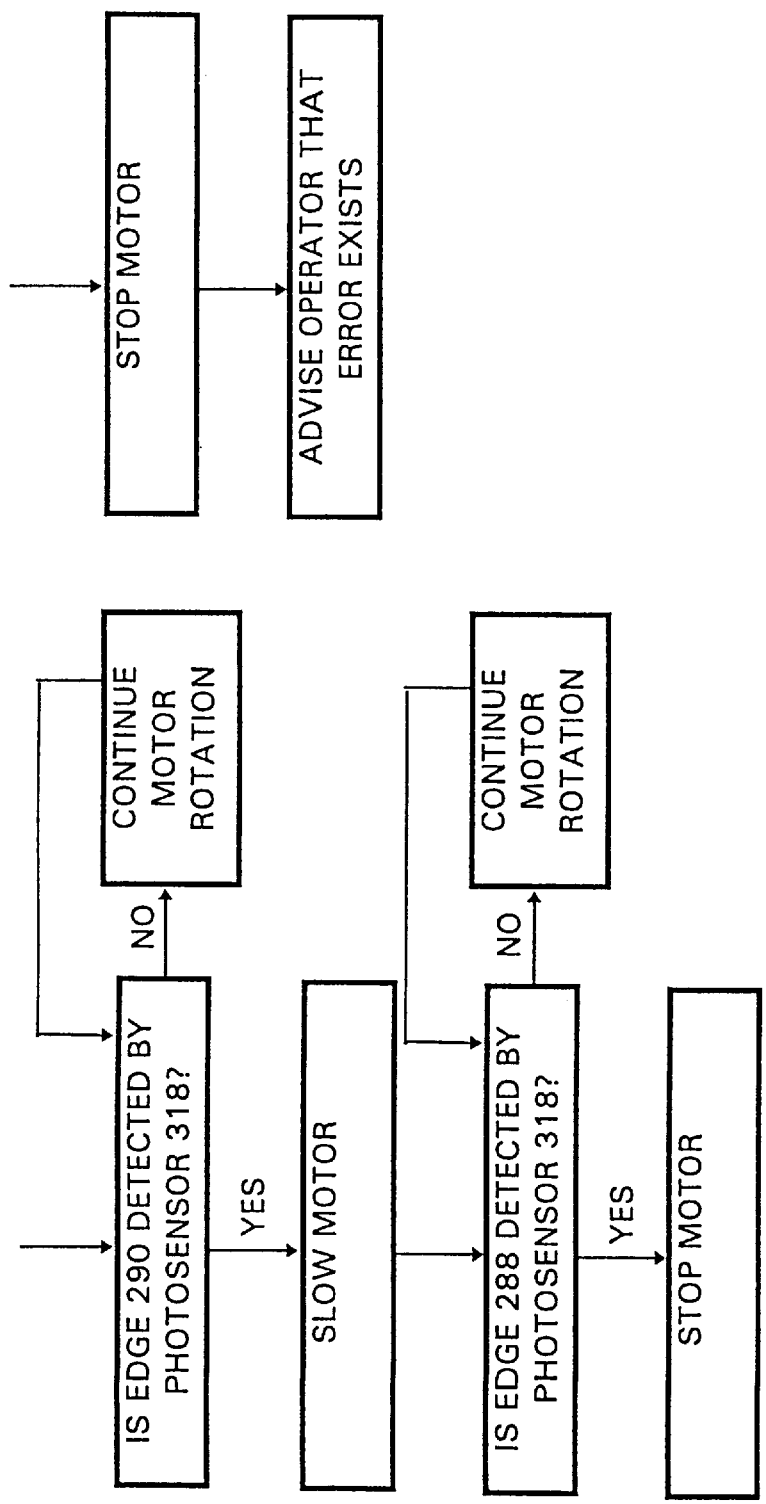
FIG. 13B is a continuation of FIG. 13A.

FIGS. 13A and 13B schematically illustrate the control process used when the insertion device 10 transfers the cartridge carrier 40 from a first operating position to a second operation position as described below.

The optical disk cartridge receiving apparatus 10 has a first operating position, FIGS. 2 and 7, for receiving an optical disk from a human operator. In this first operating position, the cartridge carrier 40 is positioned with studs 162 and 196 thereof in the forwardmost positions within their respective guides 60, 70, FIG. 7. In this position, the forward end portion 43 of the cartridge carrier is positioned approximately 7.75 mm in front of the housing front wall 114, 128 and the longitudinal axis BB of the carrier is positioned parallel to the longitudinal axis AA of the housing 30. When the cartridge inserted by the operator is fully inserted into the carrier 30, FIG. 2, a forward portion of the cartridge 12, e.g., 38.9 mm, projects outwardly from the front end 43 of the cartridge carrier 40.

When the cartridge is inserted in this manner, the photosensors 324 and 326 will sense its presence as previously described. The microprocessor 310 will then activate motor 274 in a counter-clockwise direction to begin moving the wire rope 272 and thus retracting the actuator 50 and the attached cartridge carrier 40 away from the forward end 32 of the housing.

This rearward movement will continue until the front edge 294 of the actuator second tab 292 is detected by the photosensor 312. At this point, microprocessor 310 halts rotation of the motor while proper cartridge insertion is checked using photosensor 326 in a manner as previously described. If the cartridge is not properly inserted, then the photosensor 326 will detect no light and an error condition will be indicated. At this point, microprocessor 310 may reverse the cartridge carrier to its starting position and notify the operator of the error condition via a user interface 340, FIG. 12.

If the cartridge 12 is properly inserted, then photosensor 326 will detect light through the cartridge hole 24. At this point, the microprocessor may continue the rearward movement of the cartridge carrier 40 and cartridge 12, as described below, or it may wait for further instructions from the operator via user interface 340, FIG. 12.

After proper cartridge insertion has been determined, microprocessor 310 will again activate motor 274 in a counter-clockwise direction by applying a voltage, e.g., 16 volts, across the motor to begin moving the wire rope 272 and thus further retracting the actuator 50 and the attached cartridge carrier 40 away from the forward end 32 of the housing. As actuator 50 moves rearwardly along the actuator guide 70, the cartridge carrier stud 162 will move rearwardly along the first portion 61 of the track 60, FIG. 4.

As the stud 162 enters the arcuate portion 63 of the track 60, the cartridge carrier 40 begins to rotate about the connector stud 196 in a clockwise direction. This clockwise rotation continues as the stud 162 enters and moves along the third portion 65 of the track 60 toward the end 64 of the track. As the actuator 50 further retracts and moves past the third portion 65 of the track 60, the stud 162 will reverse its direction, moving along the third portion 65 of the track 60 away from the end 64. When the stud 162 reaches the position shown in FIG. 8, the cartridge carrier 40 has been rotated a full 90 degrees.

As the stud 162 approaches this position, the rearward movement of the actuator 50 will cause the rear edge 290 of the actuator first tab 286 to move beneath and be sensed by the photosensor 318. At this point, the microprocessor slows the motor 274, by reducing the applied voltage to, e.g., 12 volts. When photosensor 318 detects the front edge 288 of the actuator first tab 286, the microprocessor halts rotation of the motor 274. Slowing the motor before stopping it in this manner allows the actuator and connected cartridge carrier to gently stop rather than impact a physical barrier.

At this point, the cartridge carrier has been rotated 90 degrees and the cartridge may be removed by the handling device 18 as shown in FIG. 3. After removal, the process may be reversed as described below to return the cartridge carrier 40 to the user interfacing position shown in FIGS. 2 and 7. The carrier may be returned with a cartridge for removal from the system or it may be returned empty in order to load another cartridge into the system.

Figure 14:
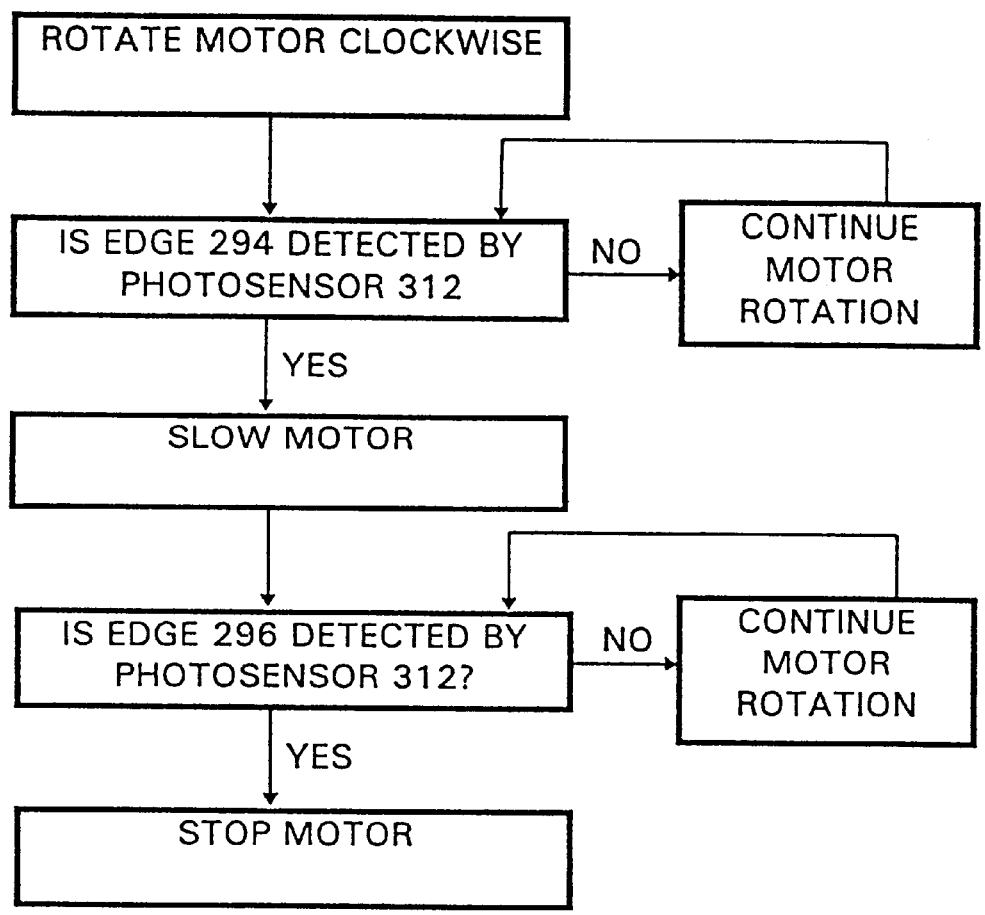
FIG. 14 is a block diagram illustrating the operation of an optical disk insertion apparatus when returning to a first operating position.

FIG. 14 schematically illustrates the control process used when the insertion device 10 transfers the cartridge carrier 40 from a second operating position to a first operation position as described below.

To return the cartridge carrier 40 to the user interfacing first operation position shown in FIGS. 2 and 7, the microprocessor 310 activates the motor 274 in a clockwise direction by applying a voltage, e.g., 18.2 volts, across the motor to begin moving the wire rope 272 and thus moving the actuator 50 and the attached cartridge carrier 40 toward the forward end 32 of the housing.

As actuator 50 moves forwardly along the actuator guide 70, the cartridge carrier stud 162 will first move into and then out of the track third portion 65 in a reverse manner from that previously described. As this happens, the cartridge carrier will begin to rotate in a counter-clockwise direction about the connector stud 196.

As the stud 162 enters the first portion 61 of the track 60, the rotation of the cartridge carrier has been completed and the cartridge carrier axis BB is once again parallel to the insertion apparatus axis AA.

Further clockwise rotation of the motor causes continued forward movement of the actuator 50 and carrier 40 toward the front of the housing 30. This forward movement of the actuator 50 will cause the front edge 294 of the actuator second tab 292 to move beneath and be sensed by the photosensor 312. At this point, the microprocessor slows the motor 274 by reducing the voltage applied to the motor 274 to, e.g., 13.5 volts. When photosensor 312 detects the rear edge 296 of the actuator second tab 292, the microprocessor halts rotation of the motor 274.

At this point, the cartridge carrier has been rotated 90 degrees to a configuration as shown in FIGS. 2 and 7 and a cartridge may be either removed or inserted by an operator.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art. For example, although an optical disk cartridge insertion apparatus has been specifically described, it is to be understood that the invention applies to any media cartridge insertion apparatus including magnetic disks (floppy and hard), tape cartridges and other data storage cartridges having a configuration which necessitates insertion of a specific orientation into a media drive.

What is claimed is:

1. A media cartridge insertion apparatus for a media cartridge storage and handling system for use in association with a media cartridge of the type having a rear end portion which is adapted to be inserted into a media drive and having a forward end portion which is adapted to be grasped by a human operator for handling the cartridge comprising:

a) a housing supporting a cartridge carrier, said housing having a forward end portion and a side portion and having a housing longitudinal axis, said housing having a forward opening for enabling hand-insertion and hand-removal of cartridges by a human operator and having a side opening for enabling machine-insertion and machine-removal of cartridges by a mechanized cartridge handling apparatus; and b) said cartridge carrier being angularly displaceable relative to said housing, said cartridge carrier having a central longitudinal axis and having forward and rear end portions which are adapted to be positioned in corresponding adjacent relationship with the forward and rear end portions of a cartridge received therein; said cartridge carrier having a forward end opening adapted to enable longitudinal insertion and removal of cartridges from said cartridge carrier; said cartridge carrier comprising a first operating position associated with hand-insertion and hand-removal of cartridges, wherein said forward end portion of said cartridge carrier is positioned proximal said forward end portion of said housing; said cartridge carrier having a second operating position associated with machine-insertion and machine-removal of cartridges, wherein said forward end portion of said cartridge carrier is positioned proximal said side portion of said housing;

c) a track having a forward end portion and a rear end portion fixedly associated with said housing and operably associated with said cartridge carrier.

2. The invention of claim 1 wherein said track comprises:

a first, linear path portion associated with said cartridge carrier first operating position;

a second, arcuate path portion connected with said first path portion;

a third, linear path portion extending transversely of said housing central longitudinal axis and connected with said second path portion and associated with said cartridge carrier second operating position.

3. The cartridge insertion apparatus of claim 1 wherein said cartridge includes at least one hole therein, the invention further comprising:

at least one photosensor located in said housing;

said at least one photosensor being laterally aligned with said at least one hole in said cartridge when said cartridge is inserted in said carrier and said carrier is in said first operating position.

4. The invention of claim 1, further comprising:

a) an actuator mechanism operably connected to said cartridge carrier;

b) an actuator guide operatively associated with said actuator mechanism, said actuator guide extending substantially parallel to said housing longitudinal axis; and wherein said actuator mechanism is connected to a wire rope.

5. The invention of claim 4 wherein said wire rope is driven by a motor.

6. The invention of claim 4 wherein said guide comprises:

a linear path portion extending parallel to said housing central longitudinal axis and associated with said cartridge carrier first operating position and said cartridge carrier second operating position.

7. The invention of claim 4 further comprising:

said actuator mechanism having at least one projection thereon;

at least one photosensor located along said guide in a position which allows sensing of said projection.

8. The invention of claim 4 wherein said cartridge carrier comprises:

a follower operatively engaged in said track.

9. The invention of claim 8 wherein said cartridge carrier is pivotally connected to said actuator mechanism at a connection point.

10. The invention of claim 9 wherein said housing comprises oppositely positioned, first and second lateral side portions which are displaced from one another in a direction transverse to said housing longitudinal axis and wherein both said track and said actuator guide are located in said housing first lateral side portion.

11. The invention of claim 9, said follower and said connection point being relatively displaced from one another in a direction perpendicular to said cartridge carrier central longitudinal axis.

12. The invention of claim 9 wherein said follower and said connection point are relatively displaced from one another in the direction of said cartridge carrier central longitudinal axis.

13. A method of inserting a media cartridge into a media cartridge storage and handling system whereby said cartridge is transferred from a first operating position associated with hand-insertion and hand-removal of cartridges to a second operating position associated with machine-insertion and machine-removal of cartridges comprising the steps of:

(a) locating a cartridge carrier at said first operating position;

(b) inserting said cartridge into said cartridge carrier;

(c) moving said cartridge carrier to an intermediate position between said first and second operating positions;

(d) checking for proper insertion of said cartridge in said cartridge carrier at said intermediate position.

14. The method of claim 13 including the further step of:

moving said cartridge carrier to said second operating position if said step of checking indicates that said cartridge is properly inserted.

15. The method of claim 13 including the further step of:

returning said cartridge carrier to said first operating position if said step of checking indicates that said cartridge is not properly inserted.

16. The method of claim 13 wherein said checking is accomplished by the use of at least one photosensor.

17. A method of inserting a media cartridge into a media cartridge storage and handling system whereby said cartridge is transferred from a first operating position associated with hand-insertion and hand-removal of cartridges to a second operating position associated with machine-insertion and machine-removal of cartridges comprising the steps of:

(a) providing an actuator that is movable along an actuator path, said actuator having a first tab located thereon;

(b) providing a cartridge carrier that is attached to said actuator;

(c) providing at least one photosensor located along said actuator path;

(d) locating said cartridge carrier at said first operating position;

(e) inserting said cartridge into said cartridge carrier;

(f) moving said actuator along said actuator path at a rate of speed thereby moving said cartridge carrier toward said second operating position;

(g) reducing said rate of speed of said actuator when a first edge of said actuator tab is sensed by said photosensor;

(h) stopping said actuator when a second edge of said actuator tab is sensed by said photosensor.

* * * * *